(12) United States Patent
Kibe et al.

(10) Patent No.: US 9,287,756 B2
(45) Date of Patent: Mar. 15, 2016

(54) ROTATING ELECTRICAL MACHINE CONTROL APPARATUS AND ROTATING ELECTRICAL MACHINE SYSTEM

(71) Applicant: KABUSHIKI KAISHA YASKAWA DENKI, Kitakyushu-shi (JP)

(72) Inventors: Yasushi Kibe, Kitakyushu (JP); Hiroaki Ohya, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 108 days.

(21) Appl. No.: 14/446,312

(22) Filed: Jul. 29, 2014

(65) Prior Publication Data

US 2015/0035465 A1 Feb. 5, 2015

(30) Foreign Application Priority Data

Jul. 31, 2013 (JP) .................................. 2013-159851

(51) Int. Cl.
| | |
|---|---|
| G01R 31/02 | (2006.01) |
| H02H 3/04 | (2006.01) |
| H02H 7/08 | (2006.01) |
| H02K 11/00 | (2006.01) |
| H02P 29/00 | (2006.01) |
| G01D 5/244 | (2006.01) |

(52) U.S. Cl.
CPC .......... *H02K 11/001* (2013.01); *G01D 5/24457* (2013.01); *H02P 29/00* (2013.01)

(58) Field of Classification Search
CPC ............................ H02K 11/001; G02R 31/343
USPC ......................................................... 318/490
See application file for complete search history.

(56) References Cited

U.S. PATENT DOCUMENTS

| | | | |
|---|---|---|---|
| 2011/0169482 A1 | 7/2011 | Tiemann | |
| 2011/0202308 A1 | 8/2011 | Kishida et al. | |
| 2012/0235610 A1* | 9/2012 | Hisano | H02P 29/022 318/400.04 |
| 2014/0035493 A1* | 2/2014 | Ajima | H02P 21/146 318/400.04 |
| 2014/0103853 A1* | 4/2014 | Yoshida | H02P 29/02 318/563 |

FOREIGN PATENT DOCUMENTS

| | | |
|---|---|---|
| DE | 10 2008 046 741 | 3/2010 |
| EP | 2312273 | 4/2011 |
| JP | 03-100411 | 4/1991 |
| JP | 04-062420 | 2/1992 |
| JP | 08-178693 | 7/1996 |
| JP | 2008-108094 | 5/2008 |

OTHER PUBLICATIONS

Extended European Search Report for corresponding EP Application No. 14179060.0-1806, Nov. 30, 2015.

* cited by examiner

Primary Examiner — Erick Glass
(74) Attorney, Agent, or Firm — Mori & Ward, LLP

(57) ABSTRACT

A rotating electrical machine control apparatus includes a position information generator and a controller, where a reset request is given from the controller, the position information generator stores position information in accordance with a first signal indicating the rotation position of a rotating electrical machine in a position storage portion, and thereafter updates the position information stored in the position storage portion on the basis of a second signal. The controller gives a reset request to the position information generator, and determines an abnormality of the position information on the basis of the position information obtained before and after the reset request is given.

15 Claims, 9 Drawing Sheets

FIG. 7

| CAUSE OF ABNORMALITY | CONTENTS OF ABNORMALITY |
|---|---|
| ENCODER CONNECTION WIRING ERROR | REVERSE ROTATION ABNORMALITY |
| CW/CCW SETTING ERROR | |
| CZ SETTING ERROR | PHASE ABNORMALITY/ REVERSE ROTATION ABNORMALITY |
| WIRING ERROR BETWEEN A-B PHASES | |
| WIRING ERROR WITHIN A-PHASE | |
| WIRING ERROR WITHIN B-PHASE | |
| WIRING ERROR BETWEEN C-D PHASES | PHASE ABNORMALITY |
| WIRING ERROR WITHIN C-PHASE | |
| WIRING ERROR WITHIN D-PHASE | |
| SETTING ERROR IN NUMBER N OF ENCODER BITS | |

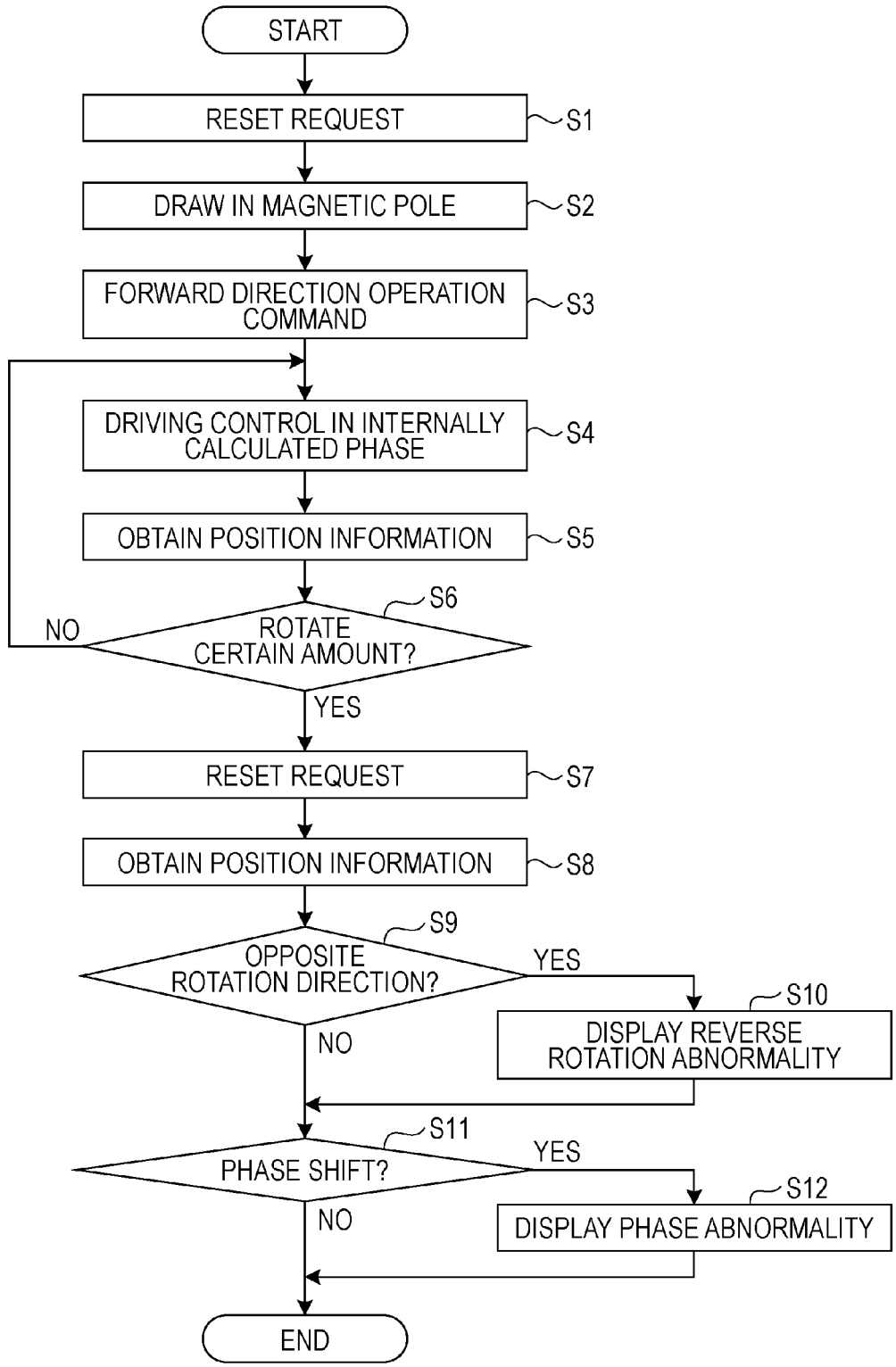

ROTATING ELECTRICAL MACHINE CONTROL APPARATUS AND ROTATING ELECTRICAL MACHINE SYSTEM

CROSS-REFERENCE TO RELATED APPLICATIONS

The present disclosure contains subject matter related to that disclosed in Japanese Priority Patent Application JP 2013-159851 filed in the Japan Patent Office on Jul. 31, 2013, the entire contents of which are hereby incorporated by reference.

BACKGROUND

1. Field of the Invention

The embodiment disclosed herein relates to a rotating electrical machine control apparatus and a rotating electrical machine system.

2. Description of the Related Art

There has been available a motor control apparatus that controls a rotating electrical machine such as a motor or a generator by detecting, with a position sensor such as an encoder, the rotation position of the rotating electrical machine. The position sensor outputs an absolute signal that indicates the rotation position of the rotating electrical machine, an incremental signal that indicates the amount of change of the rotation position of the rotating electrical machine, and the like, and the motor control apparatus obtains the rotation position of the rotating electrical machine on the basis of the signals output from the position sensor.

The rotating electrical machine control apparatus and the position sensor are connected to each other by a plurality of signal lines. Thus, a wiring error, for example, may occur in the signal lines. In the case where there is a wiring error in the signal lines, the rotation position of the rotating electrical machine is not normally obtained, thereby making it difficult to control the rotating electrical machine. In addition, the situation where the rotation position of the rotating electrical machine is not accurately obtained may occur due to a cause other than a wiring error. Also in this case, it may become difficult to control the rotating electrical machine.

To this end, there has been proposed an abnormality detection device that detects an abnormality in signal lines by comparing the amount of change of the absolute position of a rotating electrical machine, which is obtained from an absolute signal, with the amount of change of the relative position of the rotating electrical machine, which is obtained from an incremental signal (for example, see Japanese Unexamined Patent Application Publication Nos. 4-62420 and 3-100411).

There are various specifications for a position sensor used to control a rotating electrical machine. In addition, sensorless control that dispenses with a position sensor is possible for some types of rotating electrical machines. Therefore, there has been available a rotating electrical machine control apparatus in which a position information generator that generates position information indicating the rotation position of a rotating electrical machine on the basis of a signal from a position sensor is addable as an option substrate (for example, see Japanese Unexamined Patent Application Publication No. 2008-108094).

However, if the above-mentioned abnormality detection device is provided in the position information generator, the configuration of the position information generator becomes complicated, thereby increasing the manufacturing cost.

SUMMARY

According to an aspect of the embodiment, there is provided a rotating electrical machine control apparatus including a position information generator and a controller. The position information generator receives, as input, a first signal indicating a rotation position of a rotating electrical machine and a second signal indicating an amount of change of the rotation position, and generates position information indicating the rotation position based on the input signals. The controller controls the rotating electrical machine based on the position information output from the position information generator. The position information generator includes a position storage portion, an updating portion, a setting portion, and an output portion. The controller includes an obtaining portion, and an abnormality determination portion. The position storage portion stores the position information. The updating portion repeatedly updates the position information stored in the position storage portion based on the second signal. The setting portion sets, in a case where a reset request is given from the controller, the position information stored in the position storage portion to position information in accordance with the first signal. The output portion outputs the position information stored in the position storage portion to the controller. The obtaining portion obtains the position information output from the position information generator. The abnormality determination portion gives the reset request to the position information generator, and determines an abnormality of the position information based on the position information obtained by the obtaining portion before and after the reset request is given.

BRIEF DESCRIPTION OF THE DRAWINGS

FIG. 7 is a diagram illustrating the relationship among the contents and cause of each abnormality determined by an abnormality determination process;

FIG. 8 is a flowchart illustrating an example of the abnormality determination process;

DESCRIPTION OF THE EMBODIMENT

Hereinafter, a rotating electrical machine control apparatus and a rotating electrical machine system according to an embodiment will be described in detail with reference to the attached drawings. The embodiment is not limited to the following embodiment.

[1. Configuration of Rotating Electrical Machine System]

Figure 1:
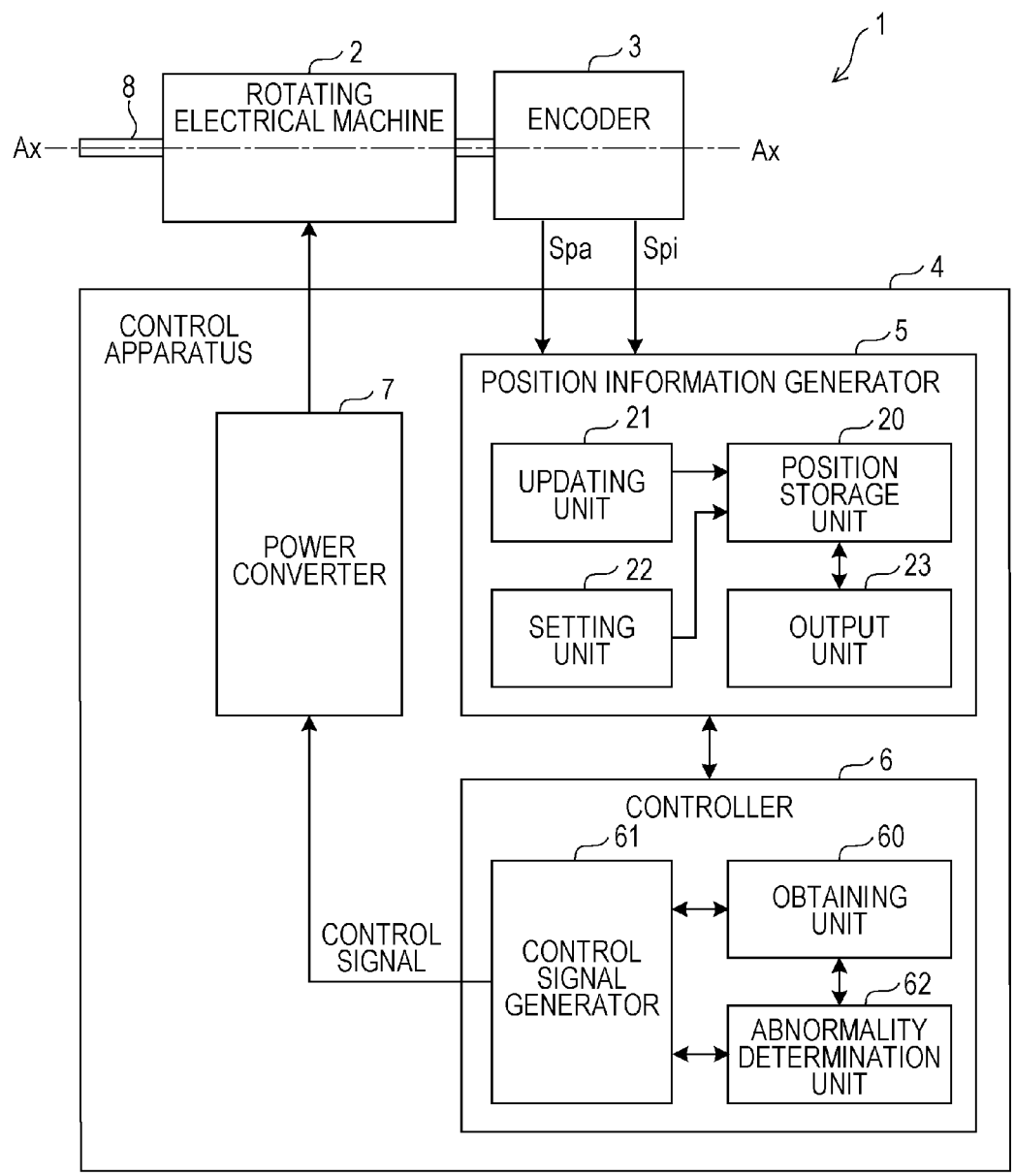
FIG. 1 is a diagram illustrating the configuration of a rotating electrical machine system according to an embodiment.

FIG. 1 is a diagram illustrating the configuration of a rotating electrical machine system according to the embodiment. As illustrated in FIG. 1, a rotating electrical machine system 1 according to the embodiment includes a rotating electrical machine 2, an encoder 3, and a control apparatus 4. The rotating electrical machine 2 rotates along with a shaft 8 around a rotation axis Ax on the basis of a current supplied from the control apparatus 4. Although it will be described in the following description that the rotating electrical machine 2 is a motor such as an interior permanent magnet (IPM) motor or a surface permanent magnet (SPM) motor, the rotating electrical machine 2 may be a generator or the like.

The encoder 3 outputs an absolute signal Spa (an example of a first signal) and an incremental signal Spi (an example of a second signal) in accordance with the rotation of the shaft 8 of the rotating electrical machine 2. The absolute signal Spa is a signal indicating the rotation position of the rotating electrical machine 2. The absolute signal Spa includes, for example, a sinusoidal signal and a cosine wave signal of one cycle per rotation of the shaft 8. One rotation of the shaft 8 has a mechanical angle of 360 degrees of the rotating electrical machine 2.

In addition, the incremental signal Spi is a signal indicating the amount of change of the rotation position of the rotating electrical machine 2. The incremental signal Spi includes, for example, a sinusoidal signal and a cosine wave signal of $2^N$ (N is an integer greater than or equal to 2) cycles per rotation of the shaft 8.

The control apparatus 4 includes a position information generator 5, a controller 6, and a power converter 7. The position information generator 5 obtains the absolute signal Spa and the incremental signal Spi from the encoder 3, and generates position information P of the rotating electrical machine 2 on the basis of these signals Spa and Spi. The position information P is information indicating the rotation position of the rotating electrical machine 2 and indicates the mechanical angle θ of the rotating electrical machine 2.

The controller 6 generates speed information of the rotating electrical machine 2 from the position information P obtained from the position information generator 5, generates a control signal for causing the deviation between the speed information and a speed command obtained from a higher apparatus to become zero, and outputs the control signal to the power converter 7. The power converter 7 outputs a current in accordance with the control signal to the rotating electrical machine 2.

The position information generator 5 is, for example, an option substrate, and is selectively connected to the controller 6. Therefore, in the case where the control apparatus 4 controls the rotating electrical machine 2 without using the position information P, it is unnecessary to connect the position information generator 5. It is thus possible to provide the control apparatus 4, which is inexpensive.

When a reset request is given, the position information generator 5 sets the position information P in accordance with the absolute signal Spa in a position storage portion 20, and thereafter updates the position information P on the basis of the incremental signal Spi.

The position information generator 5 includes the position storage portion 20, an updating portion 21, a setting portion 22, and an output portion 23. The position storage portion 20 stores the position information P of the rotating electrical machine 2. The updating portion 21 repeatedly updates the position information P stored in the position storage portion 20 on the basis of the incremental signal Spi. In addition, when a reset request is given from the controller 6, the setting portion 22 sets the position information P stored in the position storage portion 20 to position information in accordance with the absolute signal Spa. The position information P stored in the position storage portion 20 is output by the output portion 23 to the controller 6.

The controller 6 includes an obtaining portion 60, a control signal generator 61, and an abnormality determination portion 62. The obtaining portion 60 obtains the position information P output from the position information generator 5. The control signal generator 61 obtains, for example, speed information from the position information P, generates a control signal on the basis of the speed information and a speed command, and outputs the control signal to the power converter 7. The power converter 7 is, for example, an inverter or a matrix converter, and supplies a current for driving the rotating electrical machine 2 on the basis of the control signal to the rotating electrical machine 2.

The abnormality determination portion 62 gives a reset request to the position information generator 5 in a state in which the shaft 8 of the rotating electrical machine 2 is rotated by the control signal generator 61, and, on the basis of the position information P obtained by the obtaining portion 60 before and after the reset request is given, determines an abnormality of the position information P. For example, in the case where the difference between the position information P immediately before the reset request is given and the position information P immediately after the reset request is given is greater than or equal to a certain value, the abnormality determination portion 62 determines that the position information P is abnormal.

An abnormality of the position information P detected by the abnormality determination portion 62 includes, for example, a connection error between the encoder 3 and the position information generator 5 (hereinafter may be referred to as an "encoder connection error") and an error in a setting of the position information generator 5 by the controller 6. Hereinafter, an exemplary configuration of the rotating electrical machine system 1 will be more specifically described.

[2. Configuration of Encoder 3]

Figure 2:
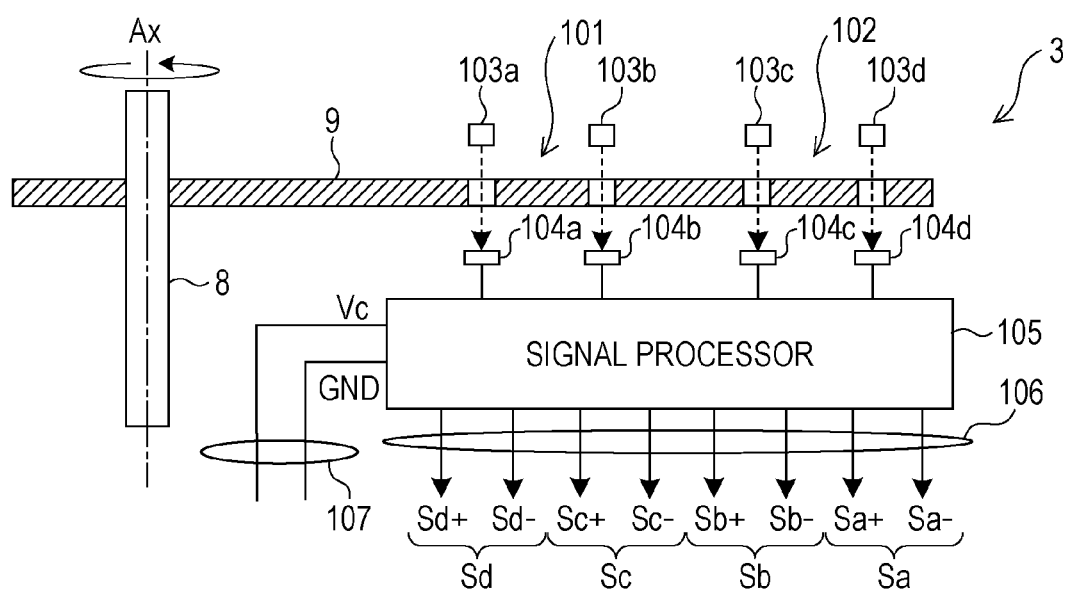
FIG. 2 is a diagram illustrating an exemplary configuration of an encoder illustrated in FIG. 1.

First, an exemplary configuration of the encoder 3 will be described. FIG. 2 is a diagram illustrating an exemplary configuration of the encoder 3. As illustrated in FIG. 2, the encoder 3 includes a rotating plate 9 that rotates around the rotation axis Ax of the shaft 8. On the rotating plate 9, an absolute pattern 101 indicating the absolute position of the rotation angle and an incremental pattern 102 indicating the relative position of the rotation angle are formed in a circumferential direction. Although the patterns 101 and 102 illustrated in FIG. 2 are transmissive patterns, the patterns 101 and 102 may be reflective patterns.

The encoder 3 includes photodiodes 103a to 103d, and photosensors 104a to 104d. The absolute pattern 101 has a C-phase pattern and a D-phase pattern. The photodiode 103a and the photosensor 104a detect the D-phase pattern. The photodiode 103b and the photosensor 104b detect the C-phase pattern.

In addition, the incremental pattern 102 has an A-phase pattern and a B-phase pattern. The photodiode 103c and the photosensor 104c detect the B-phase pattern. The photodiode 103d and the photosensor 104d detect the A-phase pattern.

The encoder 3 includes a signal processor 105. The signal processor 105 outputs an A-phase signal Sa, a B-phase signal Sb, a C-phase signal Sc, and a D-phase signal Sd in accordance with the A-phase pattern, the B-phase pattern, the C-phase pattern, and the D-phase pattern, respectively, on the basis of detection signals output from the photosensor 104a to 104d.

The A-phase signal Sa is a differential signal including signals Sa+ and Sa−. Similarly, the B-phase signal Sb, the C-phase signal Sc, and the D-phase signal Sd are differential signals. In addition, the C-phase signal Sc and the D-phase signal Sd are absolute signals Spa, and the A-phase signal Sa and the B-phase signal Sb are incremental signals Spi.

Figure 3A:
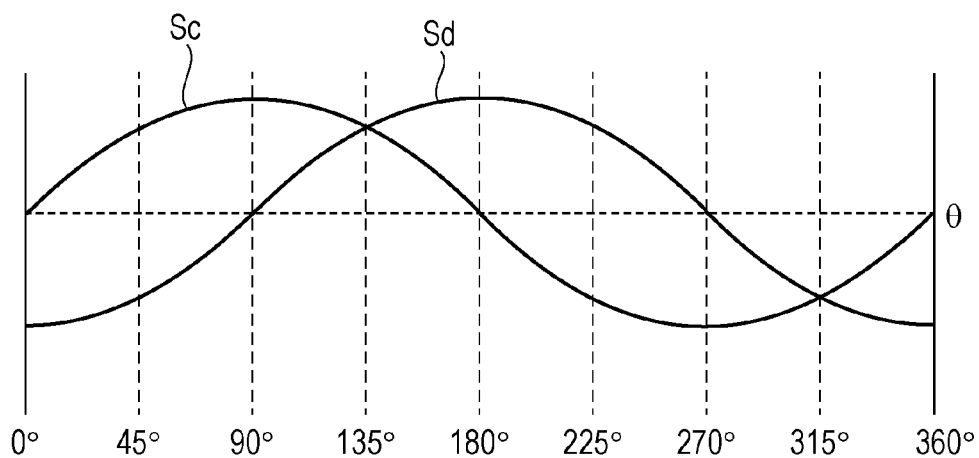
FIG. 3A is a diagram illustrating the relationship among a C-phase signal, a D-phase signal, and a motor mechanical angle.

FIG. 3A is a diagram illustrating the relationship among the C-phase signal Sc, the D-phase signal Sd, and the mechanical angle θ of the rotating electrical machine 2. As illustrated in FIG. 3A, the C-phase signal Sc is a sinusoidal signal having a mechanical angle of 360 degrees as one cycle; and the D-phase signal Sd is a cosine wave signal having a mechanical angle of 360 degrees as one cycle.

Figure 3B:
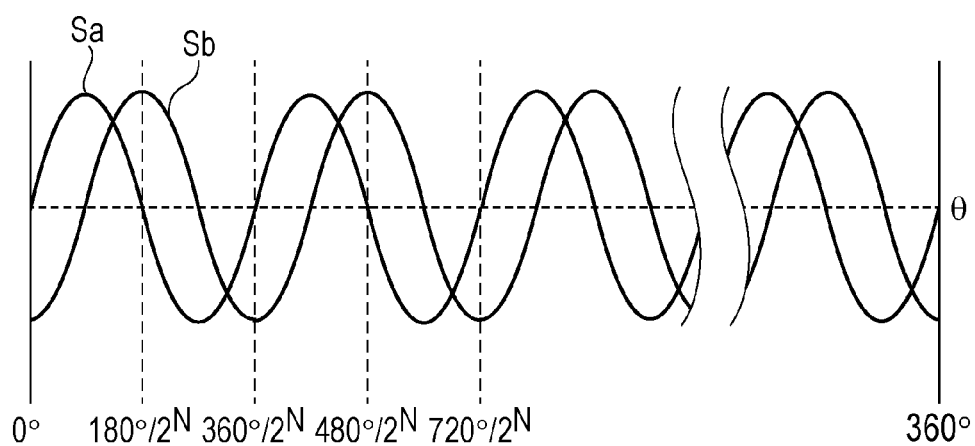
FIG. 3B is a diagram illustrating the relationship among an A-phase signal, a B-phase signal, and the motor mechanical angle.

FIG. 3B is a diagram illustrating the relationship among the A-phase signal Sa, the B-phase signal Sb, and the mechanical angle θ of the rotating electrical machine 2. As illustrated in FIG. 3B, the A-phase signal Sa is a sinusoidal signal of $2^N$ (N is an integer greater than or equal to 2) cycles per mechanical angle of 360 degrees; and the B-phase signal Sb is a cosine wave signal of $2^N$ cycles per mechanical angle of 360 degrees.

Note that the configuration of the above-mentioned encoder 3 is only exemplary, and the encoder 3 is not limited to the above-described configuration. For example, the absolute signals Spa are not limited to the C-phase signal Sc and the D-phase signal Sd illustrated in FIG. 3A, and the absolute signals Spa may be signals that become greater as the mechanical angle θ of the rotating electrical machine 2 becomes greater. In addition, the incremental signals Spi are not limited to the A-phase signal Sa and the B-phase signal Sb, and the incremental signals Spi may be signals that have a phase other than 90 degrees with each other, or may be rectangular wave signals.

[3. Configuration of Position Information Generator 5]

Figure 4:
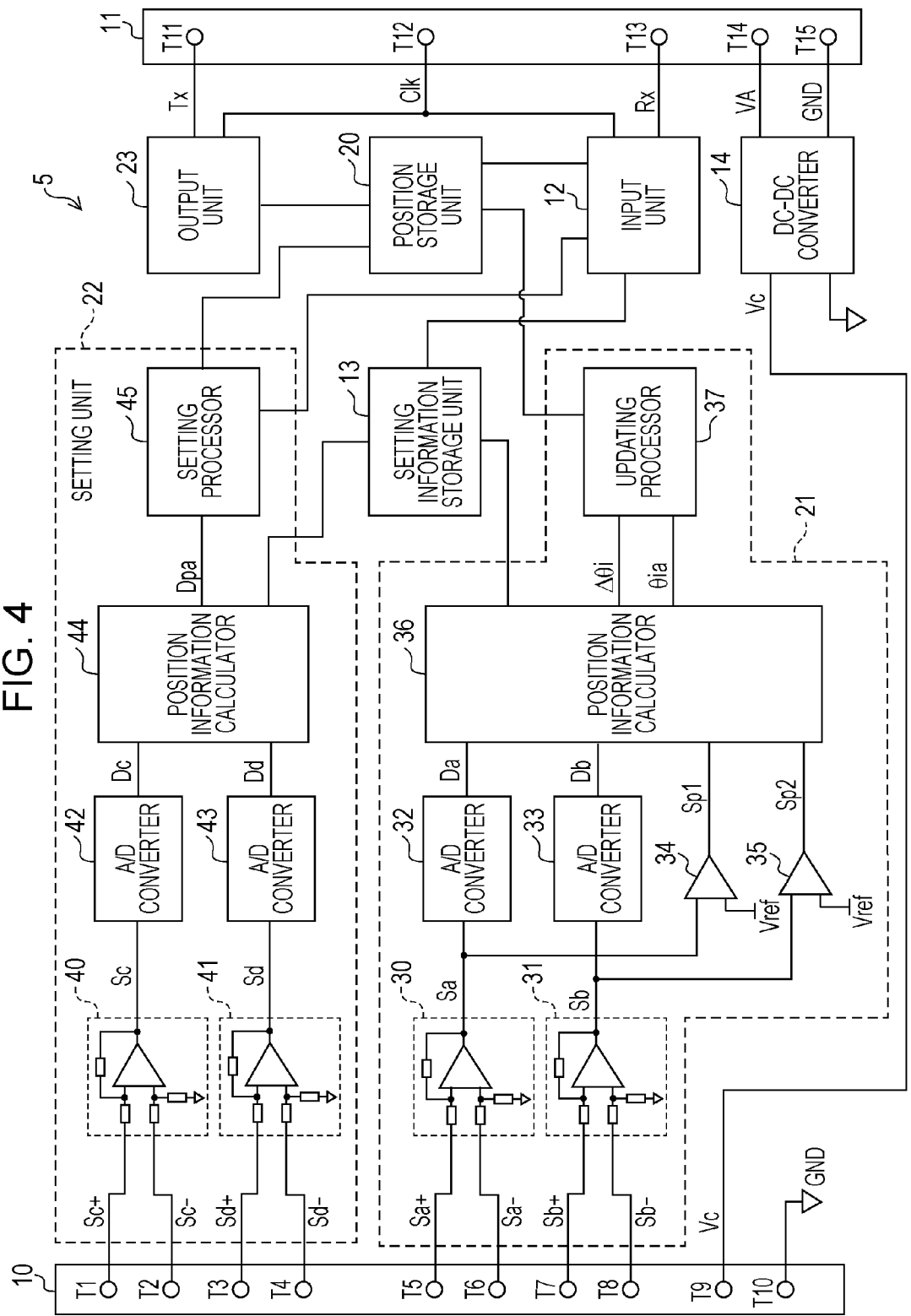
FIG. 4 is a diagram illustrating an exemplary configuration of a position information generator.

Next, an exemplary configuration of the position information generator 5 will be described. FIG. 4 is a diagram illustrating an exemplary configuration of the position information generator 5. As illustrated in FIG. 4, the position information generator 5 includes a first connector 10, a second connector 11, an input portion 12, a setting information storage portion 13, a direct-current-to-direct current (DC-DC) converter 14, the position storage portion 20, the updating portion 21, the setting portion 22, and the output portion 23.

The first connector 10 is a connector for connecting a signal cable 106 (see FIG. 2) of the encoder 3 and a power supply cable 107 (see FIG. 2) with each other. The first connector 10 includes a plurality of terminals T1 to T8 provided for the individual signal lines of the signal cable 106, and terminals T9 and T10 provided for the individual power supply lines of the power supply cable 107. In the case of installing the rotating electrical machine system 1, a person who is installing the rotating electrical machine system 1 connects the signal lines of the encoder 3 to the first connector 10, thereby connecting the encoder 3 and the position information generator 5 with each other.

The terminals T1 and T2 are terminals for connecting a pair of signal lines for transmitting the C-phase signal Sc, and the terminals T3 and T4 are terminals for connecting a pair of signal lines for transmitting the D-phase signal Sd. In addition, the terminals T5 and T6 are terminals for connecting a pair of signal lines for transmitting the A-phase signal Sa, and the terminals T7 and T8 are terminals for connecting a pair of signal lines for transmitting the B-phase signal Sb. In addition, the terminals T9 and T10 are terminals for supplying a power supply voltage Vc and a ground GND, respectively, to the encoder 3.

The second connector 11 is a connector for connecting to the controller 6. The second connector 11 includes terminals T11 to T13 for connecting the signal lines, and terminals T14 and T15 for connecting the power supply lines. By connecting the second connector 11 to the controller 6, a power supply voltage VA is supplied from the controller 6 to the position information generator 5, and it thus becomes possible to perform communication between the position information generator 5 and the controller 6.

The input portion 12 receives, as input, a signal Rx from the controller 6 via the terminal T13. The signal Rx includes, for example, a reset request RST, a position information request PREQ, and a setting request SREQ. The input portion 12 receives, as input, the signal Rx in synchronization with a clock signal Clk input from the controller 6 via the terminal T12. Although it is described here that communication between the position information generator 5 and the controller 6 is serial communication, the communication may alternately be parallel communication.

In the case where the setting request SREQ is input from the controller 6 to the input portion 12, the setting information storage portion 13 stores setting information included in the setting request SREQ. The setting information is an information extraction condition for position information, which includes, for example, the number N of encoder bits, a rotation direction CW/CCW, and a phase lead amount CZ.

The number N of encoder bits is information indicating the number of cycles of the incremental signal Spi with respect to a mechanical angle of 360 degrees of the rotating electrical machine 2. For example, in the case of N=11, the incremental signal Spi has 2048 (=$2^{11}$) cycles, and the mechanical angle of the rotating electrical machine 2 is 360 degrees; and, in the case of N=12, the incremental signal Spi has 4096 (=$2^{12}$) cycles, and the mechanical angle of the rotating electrical machine 2 is 360 degrees.

The rotation direction CW/CCW is, for example, setting information of the rotation direction of the rotating electrical machine 2. In the case where the rotation direction CW/CCW is "1", for example, it indicates that the clockwise rotation of a rotor of the rotating electrical machine 2 is a forward direction. In the case where the rotation direction CW/CCW is "0", it indicates that the anti-clockwise rotation of the rotor of the rotating electrical machine 2 is a forward direction. The phase lead amount CZ is the amount of phase shift between the A-phase and the B-phase. For example, in the case where the A-phase is a sinusoidal signal and the B-phase is a cosine wave signal, the phase lead amount CZ is set to "90".

The DC-DC converter 14 generates the power supply voltage Vc to be supplied to the encoder 3, on the basis of the power supply voltage VA and the ground GND input from the controller 6 via the terminals T14 and T15. Although the position information generator 5 operates on the basis of the power supply voltage VA, a voltage obtained by transforming the power supply voltage VA may be used.

Figure 5:
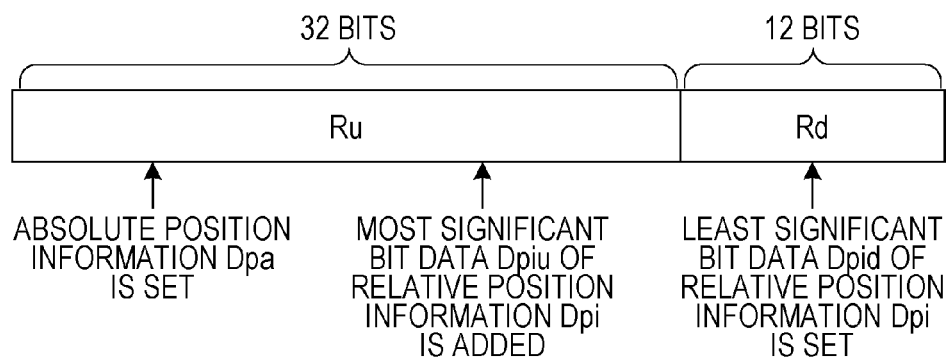
FIG. 5 is a diagram illustrating an exemplary configuration of position information.

The position storage portion 20 stores the position information P. FIG. 5 is a diagram illustrating an exemplary configuration of the position information P. As illustrated in FIG. 5, the position information P is divided into a most significant bit area Ru and a least significant bit area Rd. The most significant bit area Ru includes, for example, 32 bits, and the least significant bit area Rd includes, for example, 12 bits.

As will be described later, absolute position information Dpa is set by the setting portion 22 in the most significant bit area Ru of the position information P. In addition, the updating portion 21 adds most significant bit data Dpiu of relative position information Dpi. In addition, as will be described later, least significant bit data Dpid of the relative position information Dpi is set by the updating portion 21 in the least significant bit area Rd of the position information P.

As illustrated in FIG. 4, the updating portion 21 includes differential amplifiers 30 and 31, analog-to-digital (A/D) converters 32 and 33, pulse converters 34 and 35, a position information calculator 36, and an updating processor 37. The updating portion 21 obtains the relative position information Dpi of the rotating electrical machine 2 from the A-phase signal Sa and the B-phase signal Sb, and, with the relative position information Dpi, updates the position information P in the position storage portion 20. The relative position information Dpi is information indicating the amount of change of the mechanical angle θ of the rotating electrical machine 2.

The differential amplifier 30 amplifies the A-phase signal Sa, and outputs the amplified A-phase signal Sa to the A/D converter 32 and the pulse converter 34. The differential amplifier 31 amplifies the B-phase signal Sb, and outputs the amplified B-phase signal Sb to the A/D converter 33 and the pulse converter 35.

The A/D converter 32 has a resolution of 12 bits, for example, and converts the A-phase signal Sa to 12-bit digital data Da. In addition, the A/D converter 33 has a resolution of 12 bits, for example, and converts the B-phase signal Sb to 12-bit digital data Db.

The pulse converter 34 outputs a pulse signal Sp1 that becomes a high level in the case where the A-phase signal Sa is greater than or equal to a midpoint potential Vref and that becomes a low level in the case where the A-phase signal Sa is less than the midpoint potential Vref to the position information calculator 36. In addition, the pulse converter 35 outputs a pulse signal Sp2 that becomes a high level in the case where the B-phase signal Sb is greater than or equal to the midpoint potential Vref and that becomes a low level in the case where the B-phase signal Sb is less than the midpoint potential Vref to the position information calculator 36.

The position information calculator 36 detects "+1" or "−1" as information indicating one cycle of the incremental signal Spi and the rotation direction, on the basis of the setting information stored in the setting information storage portion 13 and the pulse signals Sp1 and Sp2, and adds "+1" or "−1" to an internal counter.

For example, it is assumed that the rotation direction CW/CCW is "1" and the phase lead CZ is "90", or the rotation direction CW/CCW is "0" and the phase lead CZ is "−90". In this case, in the case where the pulse signal Sp2 rises after the rising of the pulse signal Sp1, the position information calculator 36 adds "+1" to the internal counter. In addition, in the case where the pulse signal Sp2 falls after the rising of the pulse signal Sp1, the position information calculator 36 adds "−1" to the internal counter.

In contrast, it is assumed that the rotation direction CW/CCW is "0" and the phase lead CZ is "90", or the rotation direction CW/CCW is "1" and the phase lead CZ is "−90". In this case, in the case where the pulse signal Sp2 rises after the rising of the pulse signal Sp1, the position information calculator 36 adds "−1" to the internal counter. In addition, in the case where the pulse signal Sp2 falls after the rising of the pulse signal Sp1, the position information calculator 36 adds "+1" to the internal counter.

In response to a request from the updating processor 37, the position information calculator 36 outputs information counted by the internal counter as the most significant bit data Dpiu of the relative position information Dpi, and sets the value of the internal counter to zero. The relative position information Dpi is information indicating the amount of change Δθ of the mechanical angle θ, and the most significant bit data Dpiu is data indicating the amount of change per cycle of the incremental signal Spi.

In addition, on the basis of the digital data Da and the digital data Db, the position information calculator 36 obtains information indicating the position within one cycle of the incremental signal Spi as the least significant bit data Dpid of the relative position information Dpi. In the case where the resolution of the A/D converters 32 and 33 is 12 bits, the position information calculator 36 obtains the least significant bit data Dpid of the relative position information Dpi by calculating the following equation (1):

$$Dpid = \tan^{-1}(Da/Db) \div 2\Pi \times 2^{12} \quad (1)$$

The updating processor 37 obtains the relative position information Dpi from the position information calculator 36 with a predetermined cycle, and, on the basis of the relative position information Dpi, updates the position information P stored in the position storage portion 20. In the case where the rotation direction CW/CCW is "1", for example, the updating processor 37 updates the position information P on the basis of the relative position information Dpi. In the case where the rotation direction CW/CCW is "0", the updating processor 37 updates the position information P on the basis of the inverted relative position information Dpi. Alternatively, instead of inverting the relative position information Dpi by the updating processor 37, the position information calculator 36 may output the relative position information Dpi in accordance with the rotation direction CW/CCW.

The setting portion 22 includes differential amplifiers 40 and 41, A/D converters 42 and 43, a position information calculator 44, and a setting processor 45. The setting portion 22 obtains the absolute position information Dpa of the rotating electrical machine 2 from the C-phase signal Sc and the D-phase signal Sd, and stores the absolute position information Dpa in the position storage portion 20. The absolute position information Dpa is data indicating the mechanical angle θ of the rotating electrical machine 2.

The differential amplifier 40 performs differential amplification of the C-phase signal Sc, and outputs the result to the A/D converter 42. The A/D converter 42 has a resolution of 12 bits, for example, and converts the C-phase signal Sc to 12-bit digital data Dc. In addition, the differential amplifier 41 performs differential amplification of the D-phase signal Sd, and outputs the result to the A/D converter 43. The A/D converter 43 has a resolution of 12 bits, for example, and converts the D-phase signal Sd to 12-bit digital data Dd.

The position information calculator 44 detects the absolute position information Dpa of the rotating electrical machine 2, on the basis of the digital data Dc output from the A/D converter 42 and the digital data Dd output from the A/D converter 43.

Because the C-phase signal Sc is a sinusoidal signal and the D-phase signal Sd is a cosine wave signal, the mechanical angle θ of the rotating electrical machine 2 is derivable from the following equation (2):

$$\theta = \tan^{-1}(Dc/Dd) \quad (2)$$

Here, the number of bits of the absolute position information Dpa is N bits, which is the same as the number of encoder bits. If so, the relationship in the following equation (3) holds true. The number N of encoder bits is information indicating the number of cycles of the incremental signal Spi with respect to a mechanical angle of 360 degrees of the rotating electrical machine 2.

$$\theta/2\Pi = Dpa/2^N \quad (3)$$

Thus, the position information calculator 44 calculates the absolute position information Dpa by calculating, for example, the following equation (4). Note that the number of encoder bits is stored in the setting information storage portion 13, as described above, and the position information calculator 44 obtains the number N of encoder bits from the setting information storage portion 13.

$$Dpa = \tan^{-1}(Dc/Dd) \div 2\Pi \times 2^N \quad (4)$$

The absolute position information Dpa is data representing the mechanical angle θ with N bits, as described above. For example, in the case of N=12 and θ=90 degrees, Dpa=1023; and, in the case of N=12 and θ=180 degrees, Dpa=2047.

In the cases where the reset request RST is input from the controller 6 to the input portion 12, the setting processor 45 sets the absolute position information Dpa, which is obtained by the position information calculator 44, in the position storage portion 20. In the case where the rotation direction CW/CCW is "1", the setting processor 45 sets the absolute position information Dpa as it is in the position storage portion 20. In the case where the rotation direction CW/CCW is "0", the setting processor 45 inverts the absolute position information Dpa and sets the inverted absolute position information Dpa in the position storage portion 20. Alternatively, instead of inverting the absolute position information Dpa by the setting processor 45, the position information calculator 44 may output the absolute position information Dpa in accordance with the rotation direction CW/CCW.

Note that the A/D converters 32, 33, 42, and 43, the position information calculators 36 and 44, the updating processor 37, and the setting processor 45 are configured with, for example, a microcomputer, an application-specific integrated circuit (ASIC), and so forth. The microcomputer includes, for example, an A/D converter, an input/output bus, an input/output port, a central processing portion (CPU), a random-access memory (RAM), and so forth. In addition, the setting information storage portion 13 and the position storage portion 20 are configured with, for example, a semiconductor memory device such as a RAM or a flash memory. The input portion 12 and the output portion 23 are configured with, for example, a communication integrated circuit (IC) and so forth.

The output portion 23 outputs a signal Tx to the controller 6 via the terminal T12 in synchronization with the clock signal Clk. In the case where, for example, the position information request PREQ is input to the input portion 12, the output portion 23 obtains the position information P from the position storage portion 20, and transmits the signal Tx including the position information P to the controller 6.

[4. Configuration of Controller 6]

Figure 6:
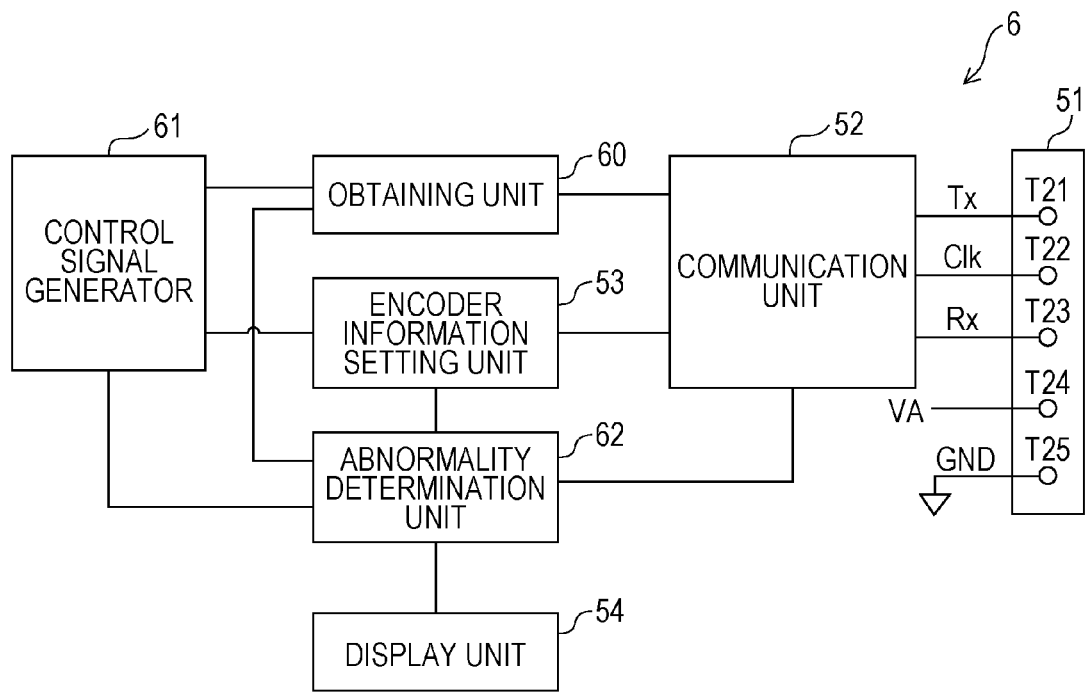
FIG. 6 is a diagram illustrating an exemplary configuration of a controller.

Next, the configuration of the controller 6 will be described. FIG. 6 is a diagram illustrating an exemplary configuration of the controller 6. As illustrated in FIG. 6, the controller 6 includes a connector 51, a communication portion 52, an encoder information setting portion 53, a display portion 54, the obtaining portion 60, the control signal generator 61, and the abnormality determination portion 62.

The connector 51 includes terminals T21 to T23 for connecting communication lines, and terminals T24 and T25 for connecting power supply lines. The connector 51 is connected to the second connector 11 of the position information generator 5. Note that the control apparatus 4 has, for example, a housing, and the position information generator 5, the controller 6, and the power converter 7 are accommodated in the housing.

The communication portion 52 is configured with, for example, a communication IC and so forth, and receives/outputs signals from/to the position information generator 5. The communication portion 52 receives, for example, the signal Tx output from the position information generator 5, and outputs the signal Rx to the position information generator 5. In addition, the communication portion 52 outputs the clock signal Clk to the position information generator 5.

The encoder information setting portion 53 periodically outputs setting information to the communication portion 52, and periodically causes the signal Rx including the setting request SREQ to be output from the communication portion 52 to the position information generator 5. The setting request SREQ includes setting information such as the number N of encoder bits, the rotation direction CW/CCW, and the phase lead amount CZ.

The display portion 54 is configured with a display device such as a liquid crystal display (LCD) or an organic electroluminescence (EL), and displays, for example, characters or an image in accordance with a request from the abnormality determination portion 62.

In response to a request from the abnormality determination portion 62, the obtaining portion 60 periodically causes the position information request PREQ to be output from the communication portion 52 to the position information generator 5. The obtaining portion 60 obtains, from the communication portion 52, the position information P included in the signal Tx output from the position information generator 5 in response to the position information request PREQ.

The control signal generator 61 obtains, for example, speed information from the position information P obtained by the obtaining portion 60, generates a control signal on the basis of the speed information and a speed command, and outputs the control signal to the power converter 7. In addition, the control signal generator 61 generates, for example, a control signal that causes a direct current (DC) to flow through the rotating electrical machine 2, outputs the control signal to the power converter 7, draws in a magnetic axis, and sets an initial magnetic pole position.

The abnormality determination portion 62 executes an abnormality determination process. Abnormalities determined by the abnormality determination process include, for example, a reverse rotation abnormality and a phase abnormality. A reverse rotation abnormality is an abnormality that the position information P changes in a direction opposite to the rotation direction of the rotating electrical machine 2 driven by the control signal generator 61. A phase abnormality is an abnormality of the position information P other than a reverse rotation abnormality. FIG. 7 is a diagram illustrating the relationship among the contents and cause of each abnormality determined by the abnormality determination process.

An encoder connection error corresponds to the case in which, for example, the output voltages Vu, Vv, and Vw of the power converter 7 are respectively connected to the U-phase, W-phase, and V-phase of the rotating electrical machine 2, and is information that the position information P indicates an inverted phase with respect to the rotation direction of the rotating electrical machine 2 driven by the control signal generator 61. In addition, a setting error in the rotation direction CW/CCW is similarly information that the position information P indicates an inverted phase with respect to the rotation direction of the rotating electrical machine 2 driven by the control signal generator 61. In the case of a setting error in the phase lead amount CZ, similarly a change of the position information P is in a direction opposite to the rotation direction of the rotating electrical machine 2 driven by the control signal generator 61.

In addition, a wiring error between the A-B phases occurs as a result of a reverse connection between the signal line of the A-phase signal Sa and the signal line of the B-phase signal Sb, resulting in an input error that the A-phase signal Sa and the B-phase signal Sb are input reversely, and hence, the position information P is updated in an opposite direction by the position information generator 5. Therefore, a change of the position information P is in a direction opposite to the rotation direction of the rotating electrical machine 2 driven by the control signal generator 61.

In the case of a wiring error within the A-phase and a wiring error within the B-phase, similarly a change of the position information P is in a direction opposite to the rotation direction of the rotating electrical machine 2 driven by the control signal generator 61. A wiring error within the A-phase occurs as a result of reverse connections of the signals Sa+ and Sa− constituting the A-phase signal Sa to the terminals T5 and T6, resulting in an input error that the signal Sa+ and the signal Sa− are input reversely. In addition, a wiring error within the B-phase occurs as a result of reverse connections of signals Sb+ and Sb− constituting the B-phase signal Sb to the terminals T7 and T8, resulting in an input error that the signal Sb+ and the signal Sb− are input reversely.

Note that, in the case of a setting error in the phase lead amount Cz, a wiring error between the A-B phases, a wiring error within the A-phase, and a wiring error within the B-phase, a phase abnormality also occurs, as will be described later.

In addition, a wiring error between the C-D phases occurs as a result of a reverse connection between the signal line of the C-phase signal Sc and the signal line of the D-phase signal Sd, resulting in the C-phase signal Sc and the D-phase signal Sd being input reversely, and hence, the position information P generated by the position information generator 5 is set to opposite-phase information. Therefore, the position information P becomes information different from the rotation position of the rotating electrical machine 2. The same applies to the case of a wiring error within the C-phase and a wiring error within the D-phase. A wiring error within the C-phase occurs as a result of reverse connections of signals Sc+ and Sc− constituting the C-phase signal Sc to the terminals T1 and T2, resulting in an input error that the signal Sc+ and the signal Sc− are input reversely. In addition, a wiring error within the D-phase occurs as a result of reverse connections of signals Sd+ and Sd− constituting the D-phase signal Sd to the terminals T3 and T4, resulting in an input error that the signal Sd+ and the signal Sd− are input reversely.

In addition, a setting error in the number N of encoder bits occurs when N=11 or N=10 is set in the case where, for example, one cycle in the A-B phase of the encoder 3 is $\frac{1}{2}^{12}$ with respect to a mechanical angle of 360 degrees. In the case where there is a setting error in the number N of encoder bits, a mismatch occurs between the amount of change of the position information P and the amount of rotation of the rotating electrical machine 2, and the position information P becomes information different from the rotation position of the rotating electrical machine 2.

Note that the encoder information setting portion 53, the obtaining portion 60, the control signal generator 61, and the abnormality determination portion 62 are configured with, for example, a microcomputer, various circuits, and so forth, and a CPU mounted on the microcomputer reads an internal program, thereby causing the these portions 53, 60, 61, and 62 to operate.

[5. Abnormality Determination Process]

Next, an example of the abnormality determination process will be described. FIG. 8 is a flowchart illustrating an example of the abnormality determination process.

As illustrated in FIG. 8, in the case where the power of the control apparatus 4 is turned on, the abnormality determination portion 62 first causes the signal Rx including the reset signal RST to be output from the communication portion 52 (step S1). Accordingly, a reset request is given from the controller 6 to the position information generator 5. Note that, in the case where the power supply voltage VA is supplied to the position information generator 5, if the setting portion 22 sets the absolute position information Dpa obtained by the position information calculator 44 in the position storage portion 20 regardless of the presence of a reset request, a reset request need not be given from the controller 6 to the position information generator 5.

Next, the abnormality determination portion 62 gives a magnetic pole drawing-in request to the control signal generator 61 (step S2). In response to the magnetic pole drawing-in request from the abnormality determination portion 62, the control signal generator 61 generates a control signal that causes DC to flow through the rotating electrical machine 2 in a fixed phase, outputs the control signal to the power converter 7, draws in the magnetic pole to the fixed phase, and sets an initial magnetic pole position.

Next, the abnormality determination portion 62 gives a forward direction operation command to the control signal generator 61 (step S3). In response to the forward direction operation command from the abnormality determination portion 62, the control signal generator 61 generates a control signal that rotates the rotating electrical machine 2 in a forward direction, outputs the control signal to the power converter 7, and performs driving control of the rotating electrical machine 2. At this time, the control signal generator 61 performs driving control of the rotating electrical machine 2 in a phase calculated internally (step S4).

In addition, the abnormality determination portion 62 stores the position information P, which is periodically obtained by the obtaining portion 60, in an internal storage portion (step S5). The position information P is obtained by the obtaining portion 60 in response to requesting, by the abnormality determination portion 62, the obtaining portion 60 to periodically output the position information request PREQ from the communication portion 52.

The abnormality determination portion 62 determines whether the amount of rotation of the rotating electrical machine 2, driven by the control signal generator 61, has become greater than or equal to a certain amount (step S6). When the abnormality determination portion 62 determines that the amount of rotation of the rotating electrical machine 2 has not become greater than or equal to the certain amount (No in step S6), the controller 6 repeatedly performs the processing in steps S4 to S6. The certain amount may be changeable as a parameter, or may be a fixed value, instead of being a parameter.

In contrast, when it is determined that the amount of rotation of the rotating electrical machine 2 has become greater than or equal to the certain amount (Yes in step S6), the abnormality determination portion 62 causes the signal Rx including the reset request RST to be output from the communication portion 52, thereby giving a reset request to the position information generator 5, as in step S1 (step S7). The abnormality determination portion 62 stores the position information P obtained by the obtaining portion 60, which is after the reset request in step S7, in the internal storage portion (step S8).

Next, the abnormality determination portion 62 determines whether the direction of change of the position information P is opposite to the rotation direction of the rotating electrical machine 2 driven by the control signal generator 61, on the basis of the position information P stored in the internal storage portion (step S9). In this process, in the case where the direction of change of the position information P is the opposite direction, the abnormality determination portion 62 determines that the rotation direction of the rotating electrical machine 2 is opposite to the direction of change of the position information P.

In the case where it is determined that the rotation direction of the rotating electrical machine 2 is opposite to the direction of change of the position information P (Yes in steep S9), the abnormality determination portion 62 performs reverse rotation abnormality display indicating that there is a reverse rotation abnormality on the display portion 54 (step S10).

In the case where it is determined that the rotation direction of the rotating electrical machine 2 is not opposite to the direction of change of the position information P (No in step S9), or in the case where the processing in step S10 ends, the abnormality determination portion 62 determines whether there is a phase shift (step S11). In this process, the abnormality determination portion 62 determines whether there is a phase shift on the basis of, for example, the position information P obtained by the obtaining portion 60 before and after the reset request is given.

In the case where it is determined that there is a phase shift (Yes in step S11), the abnormality determination portion 62 performs phase abnormality display indicating that there is a phase shift on the display portion 54 (step S12). In the case where it is determined that there is no phase shift (No in step S11), or in the case where the processing in step S12 ends, the abnormality determination portion 62 ends the abnormality determination process.

Here, a phase shift determination in step S11 will be specifically described. FIGS. 9A to 9C, 10A, and 10B are diagrams illustrating the relationship among the position information P, the power supply voltage VA, the operation command, and the reset request RST in the abnormality determination process.

Figure 9A:
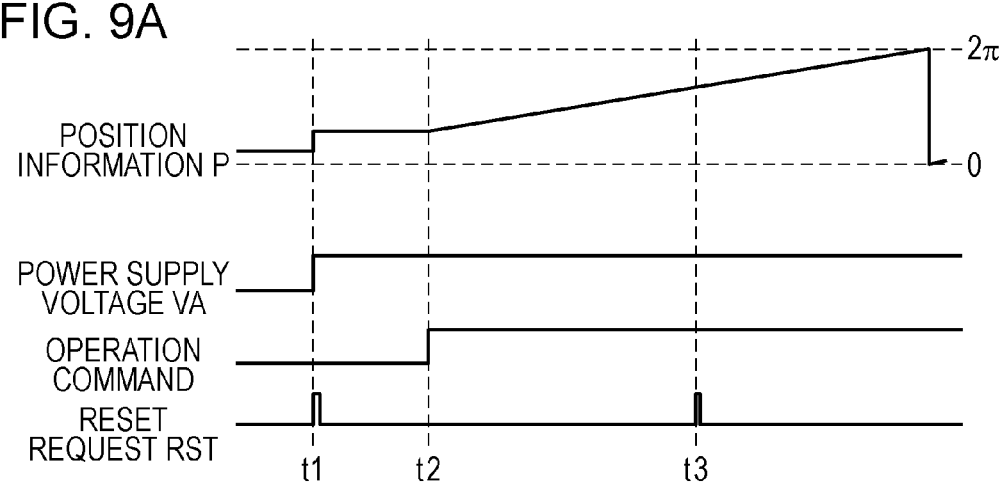
FIG. 9A is a diagram (part 1) illustrating the relationship among position information, a power supply voltage, an operation command, and a reset request in the abnormality determination process.

FIG. 9A is a diagram illustrating the relationship among the position information P, the power supply voltage VA, the operation command, and the reset request RST in the case where there is no abnormality of the position information P. As illustrated in FIG. 9A, when the power of the control apparatus 4 is turned on and the power supply voltage VA becomes a certain value or greater, the controller 6 gives a reset request to the position information generator 5 (timing t1). Accordingly, the position information generator 5 sets the position information P on the basis of the absolute signal Spa.

Thereafter, on the basis of a forward direction operation command, the controller 6 performs control to rotate the rotating electrical machine 2 in a forward direction (timing t2), and, when the amount of rotation of the rotating electrical machine 2 becomes greater than or equal to the certain amount, the controller 6 gives a reset request to the position information generator 5 (timing t3). Accordingly, the position information generator 5 sets the position information P on the basis of the absolute signal Spa. However, there is no substantial difference in the position information P output from the position information generator 5 before and after the reset request is given.

Figure 9B:
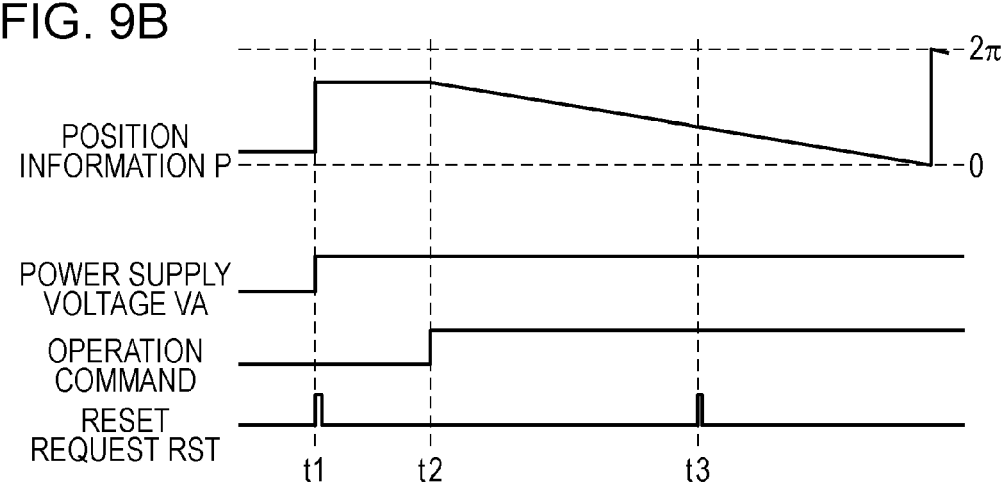
FIG. 9B is a diagram (part 2) illustrating the relationship among the position information, the power supply voltage, the operation command, and the reset request in the abnormality determination process.

In contrast, in the case where there is an abnormality of the position information P, as illustrated in FIGS. 9B, 9C, 10A, and 10B, a change of the position information P is different from that in the case where there is no abnormality of the position information P. FIG. 9B is a diagram illustrating an example of a reverse rotation abnormality that occurs as a result of an encoder connection error, a setting error in the rotation direction CW/CCW, or the like. In such a reverse rotation abnormality, the position information P becomes information that indicates an inverted phase with respect to the rotation direction of the rotating electrical machine 2 driven by the control signal generator 61.

In the case where the position information P becomes information that indicates an inverted phase with respect to the rotation direction of the rotating electrical machine 2 driven by the control signal generator 61, the abnormality determination portion 62 determines that there is a reverse rotation abnormality. Alternatively, in the case where speed information obtained by differentiating the position information P is negative, the abnormality determination portion 62 may determine that there is a reverse rotation abnormality.

Note that, in the case where it is determined that there is a reverse rotation abnormality and the amount of change of the position information P before and after the timing t3 is less than the certain amount, the abnormality determination portion 62 is capable of determining that the abnormality of the position information P occurs as a result of an encoder connection error or a setting error in the rotation direction CW/CCW. The certain amount may be changeable as a parameter, or may be a fixed value, instead of being a parameter.

Figure 9C:
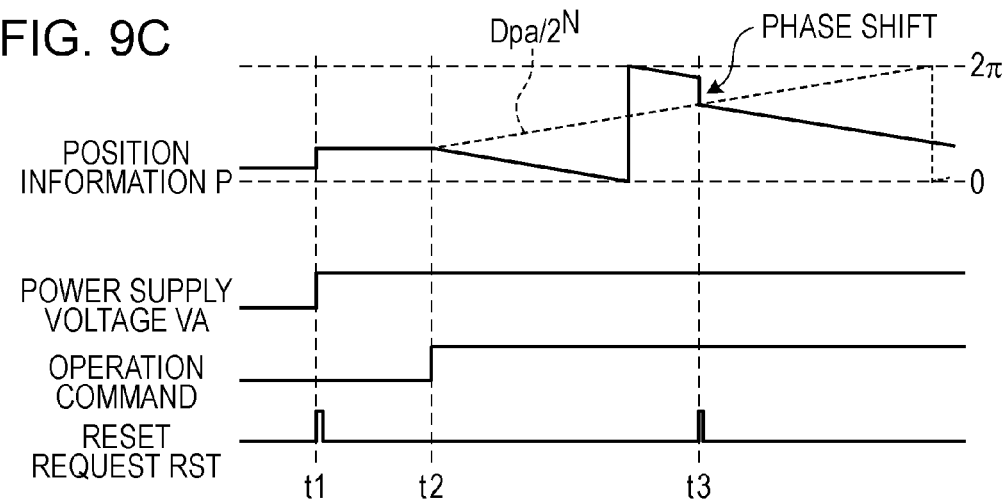
FIG. 9C is a diagram (part 3) illustrating the relationship among the position information, the power supply voltage, the operation command, and the reset request in the abnormality determination process.
Figure 10A:
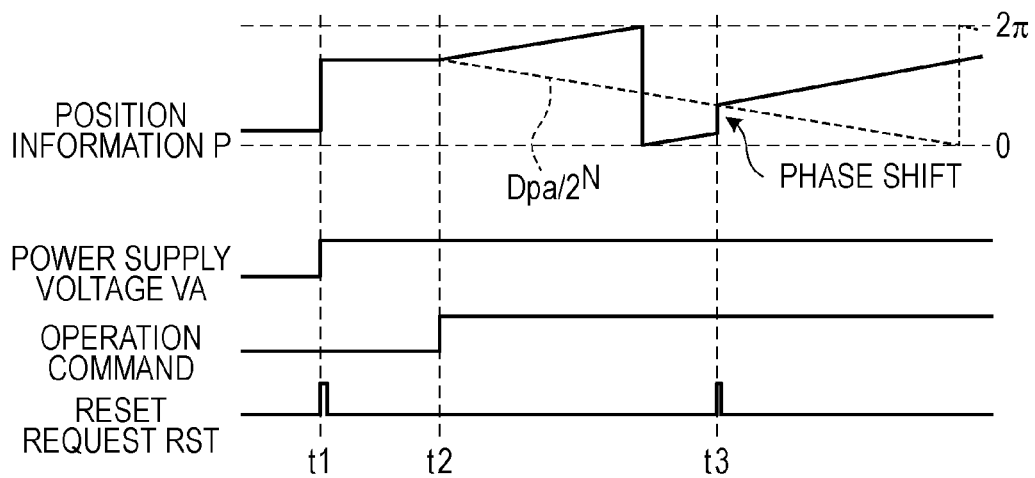
FIG. 10A is a diagram (part 4) illustrating the relationship among the position information, the power supply voltage, the operation command, and the reset request in the abnormality determination process.
Figure 10B:
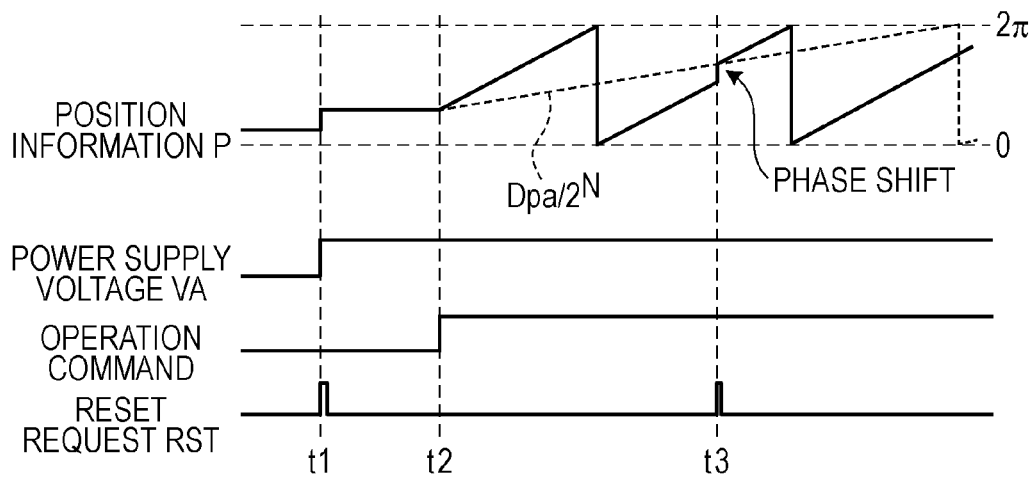
FIG. 10B is a diagram (part 5) illustrating the relationship among the position information, the power supply voltage, the operation command, and the reset request in the abnormality determination process.

In addition, in the case where there is a phase abnormality, as illustrated in FIGS. 9C, 10A, and 10B, the position information P output from the position information generator 5 greatly changes before and after the timing t3 at which the controller 6 gives a reset request to the position information generator 5.

FIG. 9C is a diagram illustrating an example of a phase abnormality that occurs as a result of a wiring error between the A-B phases, a wiring error within the A-phase, a wiring error within the B-phase, or the like. In the case of this phase abnormality (hereinafter referred to as a "first phase abnormality"), the calculation result of the absolute position information Dpa is normal, but the sign of the calculation result of the most significant bit data Dpiu of the relative position information Dpi is made opposite. Therefore, the position information P immediately after the reset request is normal, but a phase indicated by the updated position information P is changed to a negative direction. Accordingly, a phase shift occurs at the timing t3. In the case of the first phase abnormality, additionally a reverse rotation abnormality occurs.

FIG. 10A is a diagram illustrating an example of a phase abnormality that occurs as a result of a wiring error between the C-D phases, a wiring error within the C-phase, a wiring error within the D-phase, or the like. In the case of this phase abnormality (hereinafter referred to as a "second phase abnormality"), the calculation result of the most significant bit data Dpiu of the relative position information Dpi is normal, but the calculation result of the absolute position information Dpa becomes an inverted value with respect to the calculation result in a normal case. Accordingly, a phase shift occurs at the timing t3.

FIG. 10B is a diagram illustrating an example of a phase abnormality that occurs as a result of a setting error in the number N of encoder bits. The example illustrated in FIG. 10B is an example of a phase abnormality in the case where, for example, N=11 is set instead of setting N=12. In the case of this phase abnormality (hereinafter referred to as a "third phase abnormality"), the calculation result of the most significant bit data Dpiu of the relative position information Dpi is doubled from the case of N=12. Accordingly, a phase shift occurs at the timing t3.

The abnormality determination portion 62 determines that there is a phase abnormality in the case where the amount of change of the position information P before and after the timing t3 is greater than or equal to the certain amount. More specifically, for example, in the case where there are a reverse rotation abnormality and a phase shift abnormality, the abnormality determination portion 62 determines that there is a first phase shift abnormality. In addition, for example, in the case where there is a phase abnormality though there is no reverse rotation abnormality, and there is no mismatch between the amount of change of the position information P and the amount of rotation of the rotating electrical machine 2, the abnormality determination portion 62 determines that there is a second phase abnormality. In addition, in the case where there is a phase abnormality though there is no reverse rotation abnormality, and there is a mismatch between the amount of change of the position information P and the amount of rotation of the rotating electrical machine 2, the abnormality determination portion 62 determines that there is a third phase abnormality.

The abnormality determination portion 62 displays the contents and cause of the determined abnormality of the position information P on the display portion 54. Accordingly, a person who has installed the rotating electrical machine system 1, for example, is able to easily recognize a connection error between the encoder 3 and the control apparatus 4 or a setting error.

In addition, the abnormality determination portion 62 may further give a reset request to the position information generator 5 at a timing t4 (not illustrated) after the timing t3, and may determine whether there is a phase shift on the basis of the position information P obtained by the obtaining portion 60 before and after that reset request. In addition, in the case where a phase shift determination upon the reset request at the timing t3 and a phase shift determination upon the reset request at the timing t4 match, the abnormality determination portion 62 may confirm the phase abnormality determination. Accordingly, it becomes possible to more accurately perform an abnormality determination.

In addition, the abnormality determination portion 62 may determine whether there is a phase shift on the basis of the position information P obtained by the obtaining portion 60 before and after a plurality of reset requests. In addition, the abnormality determination portion 62 may periodically perform the abnormality determination process by periodically giving a reset request after normal operation is started by the control signal generator 61.

In addition, the abnormality determination portion 62 may not only display the contents and so forth of the abnormality on the display portion 54, but also perform an abnormality solving process. In the case where the abnormality determination portion 62 determines that there is an abnormality, the abnormality determination portion 62 changes the setting information in accordance with the contents of the abnormality, thereby performing an abnormality solving process.

For example, in the case where the abnormality of the position information P is the reverse rotation abnormality illustrated in FIG. 9B, the abnormality determination portion 62 outputs the signal Rx including setting information for changing the rotation direction CW/CCW from the communication portion 52 to the position information generator 5, thereby performing an abnormality solving process. The rotation direction CW/CCW is changed by setting the rotation direction CW/CCW to "1" in the case where the rotation direction CW/CCW is "0" and setting the rotation direction CW/CCW to "0" in the case where the rotation direction CW/CCW is "1".

In addition, in the case where the abnormality of the position information P is the first phase shift abnormality illustrated in FIG. 9C, the abnormality determination portion 62 outputs the signal Rx including, for example, setting information for changing the phase lead amount CZ from "90" to "−90" from the communication portion 52 to the position information generator 5, thereby performing an abnormality solving process.

In addition, in the case where the abnormality of the position information P is the third phase abnormality illustrated in FIG. 10B, the abnormality determination portion 62 outputs the signal Rx including, for example, setting information for increasing or decreasing the number N of encoder bits from the communication portion 52 to the position information generator 5, thereby performing an abnormality solving process.

In addition, in the case where the abnormality of the position information P is the second phase abnormality illustrated in FIG. 10A, and the amount of phase lead of the C-phase or D-phase is settable, the abnormality determination portion 62 outputs the signal Rx including setting information for changing the amount of phase lead of the C-phase or D-phase from the communication portion 52 to the position information generator 5, thereby performing an abnormality solving process.

After performing the abnormality solving process, the abnormality determination portion 62 outputs a forward direction operation command to the control signal generator 61 to rotate the rotating electrical machine 2 in a forward direction, and performs the abnormality determination process illustrated in FIG. 8, for example, thereby determining whether the abnormality has been solved by performing the abnormality solving process. In the case where the abnormality has not been solved, the abnormality determination portion 62 repeatedly performs the above-described abnormality solving process and abnormality determination process until the abnormality is solved. In this case, if the abnormality is not solved even when the abnormality solving process and abnormality determination process are repeated a certain number of times, the abnormality determination portion 62 may stop the abnormality solving process and display the result of the abnormality determination process on the display portion 54. In addition, in the case where it is determined that the abnormality is unsolvable as a result of the abnormality determination process, the abnormality determination portion 62 may simply display the result of the abnormality determination process on the display portion 54 without performing the abnormality solving process.

As described above, the rotating electrical machine system 1 according to the embodiment includes the position information generator 5 and the controller 6. The position information generator 5 repeatedly updates the position information P on the basis of the incremental signal Spi (an example of a second signal). In addition, in the case where a reset request is given from the controller 6, the position information generator 5 sets the position information P to position information in accordance with the absolute signal Spa (an example of s first signal). The controller 6 gives a reset request to the position information generator 5, and determines an abnormality of the position information P on the basis of the position information P obtained before and after the reset request is given. Accordingly, it becomes possible to detect an abnormality of the position information P generated on the basis of the signals from the encoder 3 (an example of a position sensor).

Although it has been described in the above embodiment that the most significant bit area Ru of the position information P increases/decreases by one in one cycle of the incremental signal Spi, the configuration of the position information P is not limited to the above-described configuration. For example, the least significant bit area Rd of the position information P may be associated with a mechanical angle of 360 degrees. In this case, if the least significant bit area Rd of the position information P has M bits, the position information generator 5 sets, for example, the absolute position information Dpa to M bits, which is of the least significant bit area Rd.

It should be understood by those skilled in the art that various modifications, combinations, sub-combinations and alterations may occur depending on design requirements and other factors insofar as they are within the scope of the appended claims or the equivalents thereof.

What is claimed is:

1. A rotating electrical machine control apparatus comprising:
    a position information generator that receives, as input, a first signal indicating a rotation position of a rotating electrical machine and a second signal indicating an amount of change of the rotation position, and generates position information indicating the rotation position based on the input signals; and
    a controller that controls the rotating electrical machine based on the position information output from the position information generator,
    wherein the position information generator includes
        a position storage portion that stores the position information,
        an updating portion that repeatedly updates the position information stored in the position storage portion based on the second signal,
        a setting portion that sets, in a case where a reset request is given from the controller, the position information stored in the position storage portion to position information in accordance with the first signal, and
        an output portion that outputs the position information stored in the position storage portion to the controller, and
    wherein the controller includes
        an obtaining portion that obtains the position information output from the position information generator, and
        an abnormality determination portion that gives the reset request to the position information generator, and determines an abnormality of the position information based on the position information obtained by the obtaining portion before and after the reset request is given.

2. The rotating electrical machine control apparatus according to claim 1,
    wherein the controller determines an abnormality of the position information caused by an input error of at least one of the first and second signals, based on the position information obtained by the obtaining portion before and after the reset request is given.

3. The rotating electrical machine control apparatus according to claim 1,
    wherein the updating portion generates the position information by extracting information from the first and second signals based on a certain information extraction condition, and
    wherein the controller determines an abnormality of the position information caused by an error of the information extraction condition, based on the position information obtained by the obtaining portion before and after the reset request is given.

4. The rotating electrical machine control apparatus according to claim 1, further comprising:
    a power converter that supplies power to the rotating electrical machine based on control of the controller,
    wherein the controller determines an abnormality of the position information caused by a connection error between the power converter and the rotating electrical machine, based on the position information obtained by the obtaining portion before and after the reset request is given.

5. The rotating electrical machine control apparatus according to claim 1,
    wherein the controller starts rotation of the rotating electrical machine, gives a reset request, again gives a reset request after a time interval, and determines whether the position information is abnormal based on the position information obtained by the obtaining portion before and after the reset request is given again.

6. The rotating electrical machine control apparatus according to claim 1, further comprising:
    a display portion whose display contents are controlled by the controller,
    wherein, in a case where the controller determines that the position information is abnormal, the controller displays contents of the abnormality on the display portion.

7. The rotating electrical machine control apparatus according to claim 1,
    wherein the updating portion generates the position information by extracting information from the first and second signals based on an information extraction condition obtained from the controller, and
    wherein, in a case where the abnormality determination portion determines that the position information is abnormal, the abnormality determination portion selects the information extraction condition for solving the abnormality, and outputs the selected information extraction condition to the position information generator.

8. A rotating electrical machine system comprising:
    the rotating electrical machine control apparatus according to claim 1;
    the rotating electrical machine; and
    an encoder that detects rotation of the rotating electrical machine and outputs the first and second signals.

9. A rotating electrical machine control apparatus comprising:
    position information generating means for receiving, as input, a first signal indicating a rotation position of a rotating electrical machine and a second signal indicating an amount of change of the rotation position, and generating position information indicating the rotation position based on the input signals; and control means for controlling the rotating electrical machine based on the position information output from the position information generating means, wherein the position information generating means includes position storage means for storing the position information, updating means for repeatedly updating the position information stored in the position storage means based on the second signal, setting means for setting, in a case where a reset request is given from the control means, the position information stored in the position storage means to position information in accordance with the first signal, and output means for outputting the position information stored in the position storage means to the control means, and wherein the control means includes obtaining means for obtaining the position information output from the position information generating means, and abnormality determination means for giving the reset request to the position information generating means, and determining an abnormality of the position information based on the position information obtained by the obtaining means before and after the reset request is given.

10. The rotating electrical machine control apparatus according to claim 9, wherein the control means determines an abnormality of the position information caused by an input error of at least one of the first and second signals, based on the position information obtained by the obtaining means before and after the reset request is given.

11. The rotating electrical machine control apparatus according to claim 9, wherein the updating means generates the position information by extracting information from the first and second signals based on a certain information extraction condition, and wherein the control means determines an abnormality of the position information caused by an error of the information extraction condition, based on the position information obtained by the obtaining means before and after the reset request is given.

12. The rotating electrical machine control apparatus according to claim 9, further comprising:

power converting means for supplying power to the rotating electrical machine based on control of the control means, wherein the control means determines an abnormality of the position information caused by a connection error between the power converting means and the rotating electrical machine, based on the position information obtained by the obtaining means before and after the reset request is given.

13. The rotating electrical machine control apparatus according to claim 9, wherein the control means starts rotation of the rotating electrical machine, gives a reset request, again gives a reset request after a time interval, and determines whether the position information is abnormal based on the position information obtained by the obtaining means before and after the reset request is given again.

14. The rotating electrical machine control apparatus according to claim 9, further comprising:

display means whose display contents are controlled by the control means, wherein, in a case where the control means determines that the position information is abnormal, the control means displays contents of the abnormality on the display means.

15. The rotating electrical machine control apparatus according to claim 9, wherein the updating means generates the position information by extracting information from the first and second signals based on an information extraction condition obtained from the control means, and wherein, in a case where the abnormality determination means determines that the position information is abnormal, the abnormality determination means selects the information extraction condition for solving the abnormality, and outputs the selected information extraction condition to the position information generating means.

* * * * *